UNITED STATES PATENT OFFICE.

DON D. HARDING AND ALONZO L. MEDDOCK, OF DELTA, COLORADO.

CEMENT PLASTER.

SPECIFICATION forming part of Letters Patent No. 651,073, dated June 5, 1900.

Application filed September 9, 1899. Serial No. 729,992. (No specimens.)

*To all whom it may concern:*

Be it known that we, DON D. HARDING and ALONZO L. MEDDOCK, citizens of the United States, residing at Delta, in the county of Delta and State of Colorado, have invented certain new and useful Improvements in Cement Plaster; and we do declare the following to be a full, clear, and exact description of the invention, such as will enable others skilled in the art to which it appertains to make and use the same.

Our invention relates to compositions of matter known as "cement plaster."

One object of our invention is the production of a plastering compound cheap enough to be employed in the majority of instances as mortar, yet of such quality as to render it particularly valuable for coating interiors, exteriors, or any surfaces requiring plastic protection.

A further object of our invention is to prepare a plaster ready for mixing with water that is capable of transportation over any distances without deterioration, that will retain its original condition for an indefinite period when not exposed to moisture, and which by reason of the peculiar proportions of its ingredients ascertained by trial and experiment when watered according to our formula remains soft and easily workable for some time and then sets and dries into an unusually tough and hard layer, free from objectionable cracking and peeling following the use of numerous receipts for compositions in this class.

Our invention consists in mixing the materials hereinafter named in the proportions stated, or when larger quantities are needed the parts are increased by multiplying each quantity by the same factor.

We take one hundred pounds of calcined gypsum, eighty pounds of sand, four pounds of wheat-flour, three ounces (three-sixteenths of one pound) of glue, ground fine, three ounces of white vitriol, (zinc sulfate,) three ounces of saltpeter, (potassium nitrate,) and when the plaster is to be mixed there is added forty pounds of rain-water. The quantities of the ingredients above set out are such as give the best result under average conditions of heat and moisture.

To hasten the setting of our plaster, the elements of glue, white vitriol, and saltpeter may be decreased to one-eighth of a pound each and the sand element to seventy pounds. To retard the setting somewhat, the glue, white vitriol, and saltpeter may be increased to one-quarter pound each and the sand to ninety pounds.

Free from water our plaster may be put up in sacks or barrels and transported to any distance or kept indefinitely.

We are aware that the substances mentioned above have been employed in combination with various other materials to form plaster, and we do not claim their use, broadly.

What we claim, and desire to secure by Letters Patent of the United States, is—

A cement plaster consisting of a mixture of calcined gypsum, sand, wheat-flour, glue, white vitriol, saltpeter and rain-water, in the proportions substantially as specified.

In testimony whereof we affix our signatures in presence of two witnesses.

DON D. HARDING.
    ALONZO L. MEDDOCK.

Witnesses:
 FRED N. DICKERSON,
 WM. H. MATHERS.